O. SASS.
VALVE FACING DEVICE.
APPLICATION FILED NOV. 9, 1916.
1,217,836.
Patented Feb. 27, 1917.
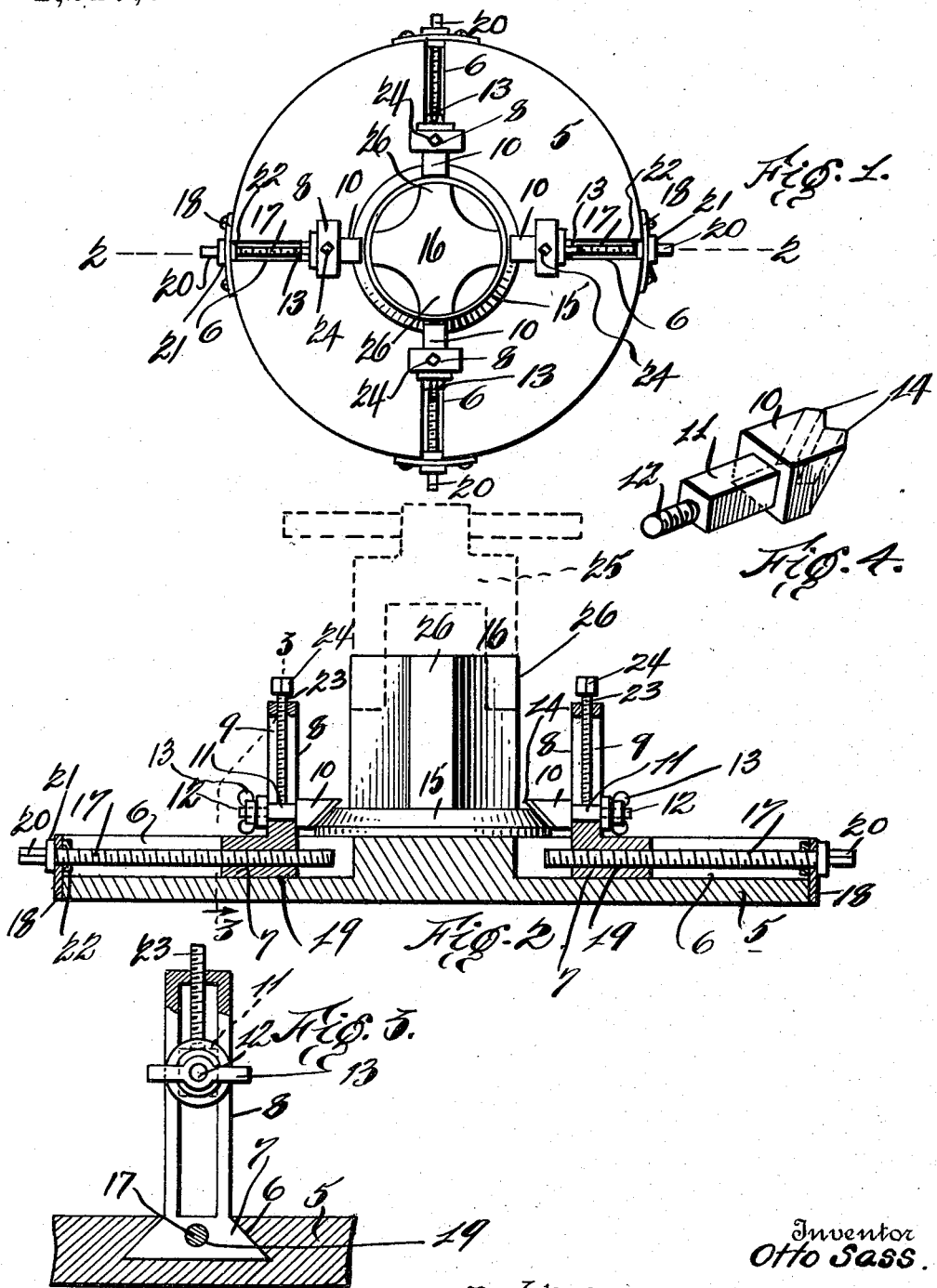
Inventor
Otto Sass.
By his Attorney

UNITED STATES PATENT OFFICE.

OTTO SASS, OF BROOKLYN, NEW YORK.

VALVE-FACING DEVICE.

1,217,836.        Specification of Letters Patent.      Patented Feb. 27, 1917.

Application filed November 9, 1916. Serial No. 130,417.

*To all whom it may concern:*

Be it known that I, OTTO SASS, a subject of the Emperor of Germany, residing at Brooklyn, Kings county, and State of New York, have invented certain new and useful Improvements in Valve-Facing Devices, of which the following is a full, clear, and exact description.

This invention relates to improvements in valve-facing tools, the object being to provide a portable device arranged to receive and face the valve of engines, pumps or the like. My invention is especially intended for field work, that is to say, to enable a mechanic to face a valve in places where there ordinarily are no lathes, as on board a ship, for instance. Even though a ship be provided with a lathe, my device will be found very useful, as it can be carried to any place and used without the necessity of transporting a removed valve to other parts of the ship. When a valve is to be faced or refaced it will be placed upon my device, after which cutters are adjusted to the part to be faced or refaced. After the cutters have been adjusted (said cutters acting also as clamps) the valve will be turned by a wrench or other device, thereby causing the cutters to act to face the valve, all of which will be hereinafter more fully explained.

I will now proceed to describe my invention in detail, the essential features of which will be summarized in the appended claims, reference being had to the accompanying drawing, forming part hereof, wherein:

Figure 1 is a top plan view of my improved facing device;

Fig. 2 is an enlarged sectional view, the section being taken on a line 2—2 in Fig. 1;

Fig. 3 is an enlarged detail sectional view, the section being taken on a line 3—3 in Fig. 2, the cutter being illustrated in a higher position than is illustrated in Fig. 1; and Fig. 4 is a perspective view of one of the cutters.

As herein embodied, my invention comprises a plate or support 5 provided with radially disposed slots or guideways 6, 6, 6, 6 to slidably retain the guide-blocks 7 of carriers 8. The carriers 8 are each provided with a guide-way 9 to slidably retain cutters 10. Each cutter 10 carries a squared shank 11 provided with a rounded threaded stud 12 to receive a wing-nut 13, said wing-nut serving to bind or hold the cutter in place. Each cutter 10 carries cutting teeth or edges 14 disposed at approximately an angle of forty-five degrees. The edges 14 of the cutters 10 face the surface 15 of the valve, herein indicated by 16. The valve may be any valve that needs refacing.

To adjust the carriers 8 longitudinally of the slots 6, I provide feed-screws or spindles 17 each rotatably supported adjacent the outer ends thereof by a plate 18, the plates 18 being removably secured to the support 5. Each spindle 17 passes through a threaded opening 19 in each carrier 8. The outer end of each spindle is squared as at 20 to receive a wrench. Each spindle 17 is held in place by a collar 21 and a block 22 which bears against the inside surface of a corresponding plate 18.

To put sufficient pressure upon the cutters to cause them to act, I provide rotatable threaded feeding screws 23 having heads 24 to receive a wrench. The screws 23 engage threaded openings in the upper end of each carrier and bear at their lower ends against a corresponding cutter shank 11. To reface a valve, such as indicated by 16, I place the same upon the support 5 face upward, as shown in Fig. 2. I next manipulate the spindle 17 to cause the carriers 8 to move toward the center of the support until the cutters are brought nearly to the proper position. I next manipulate the feed screws 23 to move the cutters downwardly to nearly the proper position, the wing-nuts 13 being loosened. After having performed the above named operations, I alternately manipulate the spindles 17 and screws 23 until all of the cutters 10 bear against the valve face 15. After having set the cutters and tightened the nuts 13, I rotate the valve 16 by means of a wrench, or forked tool (indicated by dotted lines 25, Fig. 2), which will engage the wings 26 of the valve. The rotation of the valve will cause the cutters to trim or shave the face 15 of the valve. The first cut will be a roughing cut, but to produce a finishing cut, I merely move the cutters downwardly slightly by means of the feed-screws 23.

While my improved device is intended mainly for refacing purposes, it is obvious that it can be also used to produce a face upon a new valve.

The cutters 10 act as a centering device, to maintain the valve centrally upon the support 5, after they have once been properly set. A valve can be approximately positioned upon the support, before the cutters have been adjusted, by means of calipers. After the cutters have been brought into contact with the valve, a more exact positioning can be obtained by manipulating the spindles 17.

What I claim as my invention is:

1. A valve-facing tool consisting of a support, carriers slidably secured to said support, each carrier being provided with a guideway, a cutter slidably mounted in each guideway, and a feed screw carried by each carrier to exert a downward pressure upon the cutter in contact therewith.

2. A valve-facing tool consisting of a support provided with radially disposed slots, a carrier slidably mounted in each slot, each carrier being provided with a guideway, a threaded spindle in each slot engaging a corresponding carrier to adjust same longitudinally of its slot, a cutter slidably mounted in the guideway of each carrier, and a feed screw carried by each carrier to exert a downward pressure upon the cutter in contact therewith.

3. A valve-facing tool consisting of a support to rotatably retain a valve face upward, a plurality of radially adjustable cutters carried by said support, and means to adjust each of said cutters relatively to the center of said support and also to the face of the valve retained by the support.

4. A valve-facing tool consisting of a support provided with a plurality of radially disposed slots having angularly disposed side-walls, a guide-block slidably mounted in each slot, a carrier mounted on each guide block and provided with a guide-way, a rotatable threaded spindle located in each slot and engaging a corresponding guide-block, a cutter carried by each carrier and having a square shank to engage the guideway in a corresponding carrier, a feed-screw carried by each carrier and engaging the square shank of a corresponding cutter, a threaded stud carried by each square shank, and a wing-nut carried by each threaded stud to lock said cutters in adjusted positions.

Signed at New York city, N. Y., this 6th day of November, 1916.

OTTO SASS.

Witnesses:
MAURICE BLOCK,
ALBERT A. LUSTIG.

Copies of this patent may be obtained for five cents each, by addressing the "Commissioner of Patents, Washington, D. C."